(No Model.)
J. FUCHS.
MEANS FOR DESTROYING INSECTS OR MICROBES ON PLANTS.
No. 565,384. Patented Aug. 4, 1896.
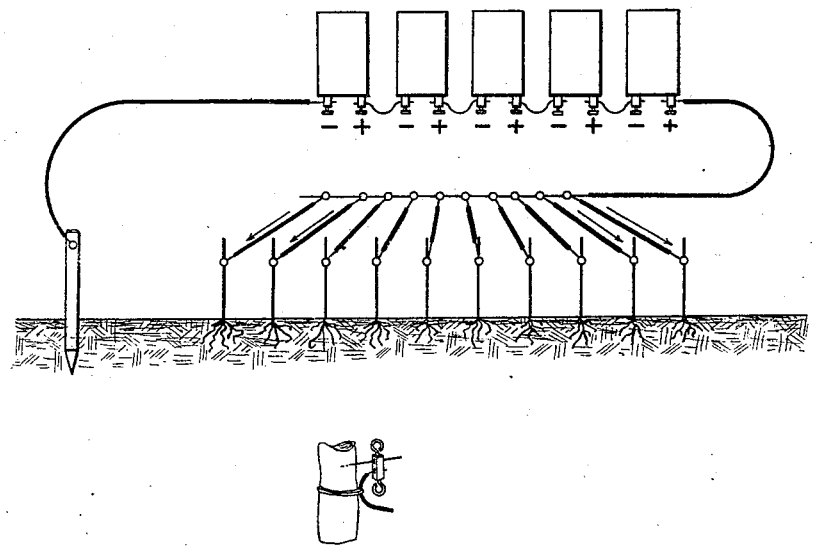
Witnesses
D. H. Blakelock.
J. Stephen Giusta
Inventor
Jean Fuchs,
by Whitman & Wilkinson,
Attorneys.

UNITED STATES PATENT OFFICE.

JEAN FUCHS, OF PORTO FERRAJO, ITALY.

MEANS FOR DESTROYING INSECTS OR MICROBES ON PLANTS.

SPECIFICATION forming part of Letters Patent No. 565,384, dated August 4, 1896.

Application filed January 17, 1896. Serial No. 575,899. (No model.) Patented in France October 25, 1895, No. 248,451.

*To all whom it may concern:*

Be it known that I, JEAN FUCHS, a citizen of the French Republic, residing at Porto Ferrajo, Island of Elba, Kingdom of Italy, have invented new and useful Improvements in Means for the Destruction of Insects or Microbes on Plants, (for which Letters Patent of France were granted to me October 25, 1895, No. 248,451,) of which the following is a specification.

The present invention has for its object the destruction of phylloxera or noxious microbes on plants. The means employed consists substantially in leading an electric current through the plants. This current can be an alternating, multiphase, or continuous one, and when led through the plants for a short time, say three to six times in a season for an hour at a time, destroys the microbes on the plants, whether they be on the stems, leaves, fruits, or roots; but this process is especially important by reason of its power radically to destroy phylloxera. The trials have shown that vines affected by phylloxera for two years, after treatment according to the present process, not only recovered, but also became extraordinarily fruitful. The current may be supplied by any source of electricity.

The application of the process is effected, for example, in the following manner: Should it be required to treat ten vines at the same time, a battery of fifty elements connected in series must be employed. One pole of the source of electricity is connected with an iron rod, which is stuck into the earth in a suitable place two or three meters deep, according to the humidity of the place. With the other pole are connected the insulated wires leading to the separate plants. These wires are bare at the ends and lead into the sappy layers of the plants at a height of about thirty to fifty centimeters from the ground. The electric current passes then from one pole of the battery through the insulated conductors to the sappy layers of the plant, from thence to the roots, and comes out in the earth, through which it returns to the iron rod and passes through the return-wires to the other pole of the battery. So the circuit is closed and can exercise the intended action on the plants. After an hour's time the wires are removed from the plants and the circuit broken.

It is advisable to electrify a certain number of plants, say ten, at the same time, for which purpose suitable needles are stuck into the stems and the end of each needle is connected with a long insulated wire by means of binding-screws, and all the wires are connected to the end of the main conductor, as shown in the accompanying drawing. When the stem of the plant is not hard, but still full of sap on the surface, instead of using needles the uninsulated ends of the wires can be wound around the stem. If it is wanted to use a wire uninsulated right through for shorter conductors, then care must be taken that they should not come in contact with other objects on the way, because then the current would be taken off, there would be no effect produced on the plants, and the battery might suffer damage. It is of no importance as regards its effect upon the current whether the iron rod be near or far off from the plants. If the rod is in a very dry place, then a hole of about one meter diameter is digged around the rod and filled with water about an hour before using the apparatus.

Having now particularly described and ascertained the nature of the said invention and in what manner the same is to be performed, I declare that what I claim is—

In the destruction of phylloxera and microbes by electricity, the combination with a source of electricity, of a conductor connecting the said source with the plant under treatment, a needle provided with a binding-post and inserted in the said plant and connected to the conductor aforesaid, and a rod buried in the earth and connected by a conductor to the source of electricity, substantially as described.

In testimony whereof I have signed my name to this specification, in the presence of two subscribing witnesses, this 14th day of December, A. D. 1895.

JEAN FUCHS.

Witnesses:
    GIUSEPPE V. OLLICH,
    OTTORINO LAZZARI.